United States Patent [19]

Suzuki et al.

[11] 3,879,350

[45] Apr. 22, 1975

[54] AMMONIUM SALTS AND POLYMERIZATION OF FORMALDEHYDE THEREWITH

[75] Inventors: Isamu Suzuki; Shinichi Ishida; Noboru Ohshima; Junzo Masamoto; Junzo Ohtake, all of Kurashiki, Japan

[73] Assignee: Asahi Kasei Kogyo Kabushiki Kaisha, Osaka, Japan

[22] Filed: Oct. 26, 1973

[21] Appl. No.: 410,239

[52] U.S. Cl. .......................... 260/67 FP; 260/501.15
[51] Int. Cl. ................................................ G08g 1/02
[58] Field of Search ................................. 260/67 FP

[56] References Cited
UNITED STATES PATENTS

| | | | |
|---|---|---|---|
| 2,994,687 | 8/1961 | Goodman et al................ | 260/67 FP |
| 3,297,646 | 1/1967 | Bernsmann...................... | 260/67 FP |
| 3,718,630 | 2/1973 | Leverett.......................... | 260/67 FP |

*Primary Examiner*—Lucille M. Phynes
*Attorney, Agent, or Firm*—Flynn & Frishauf

[57] ABSTRACT

This invention provides novel diammonium salts comprising ammonium cations wherein four organic groups attached to the nitrogen atom are selected from the group consisting of alkyl, aralkyl, alkoxyalkyl and alkylaryl containing 2 or more carbon atoms and may be the same or different or two of them may form a ring each other and an aliphatic dicarboxylate anion with a side chain containing 6 or more carbon atoms and selected from the group consisting of alkyl, alkoxy, polyalkylene, alkenyl and polyalkenyl, process for preparing the same and use of the same particularly as initiators for polymerization of formaldehyde.

7 Claims, 1 Drawing Figure

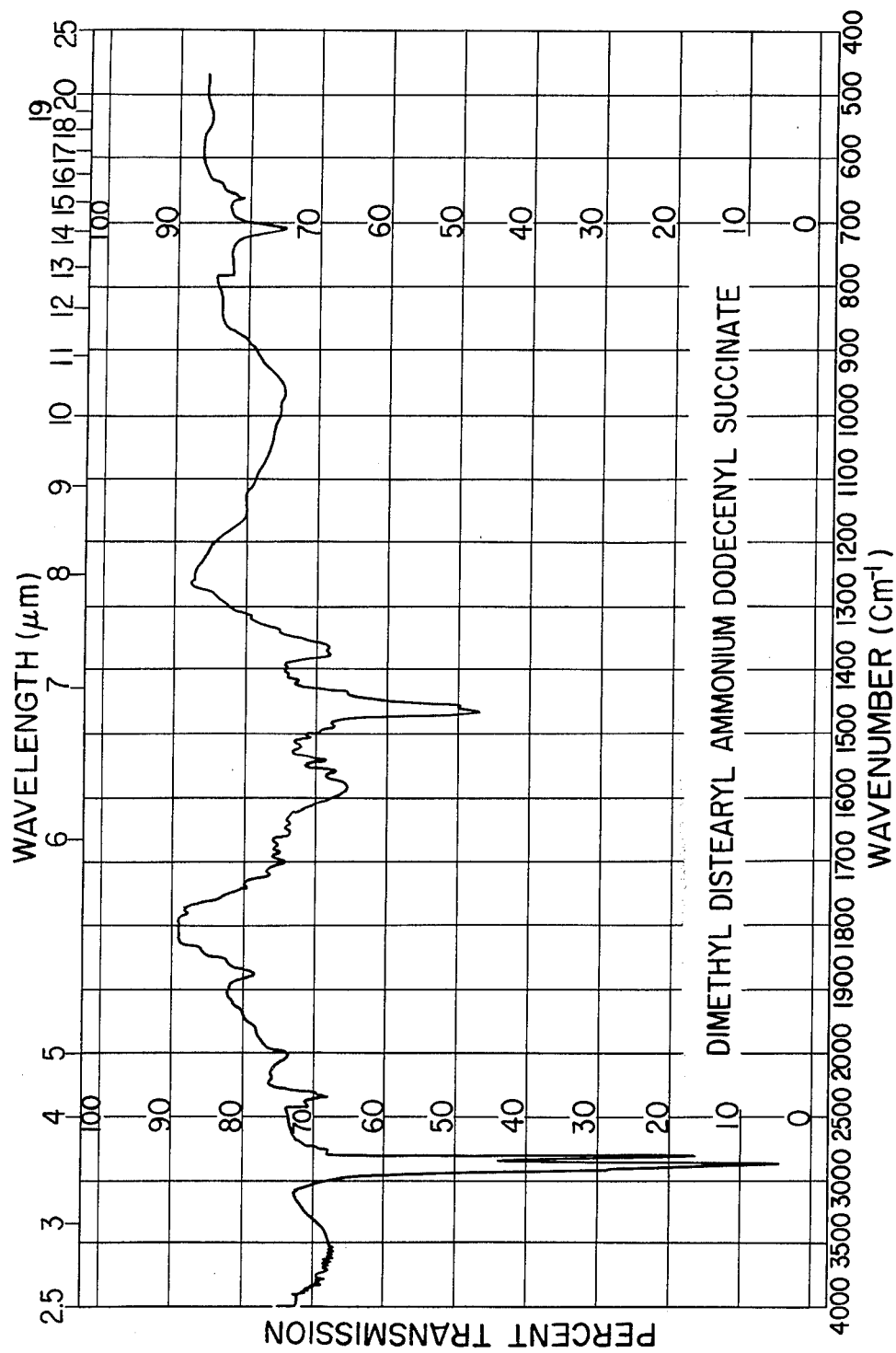

AMMONIUM SALTS AND POLYMERIZATION OF FORMALDEHYDE THEREWITH

BACKGROUND OF THE INVENTION

1. Field of the Invention

This invention relates to novel ammonium compounds and use of the same particularly as polymerization catalysts of formaldehyde.

More particularly, the invention is concerned with novel ammonium salts comprising ammonium cations wherein four organic groups are attached to the nitrogen atom and a dicarboxylate anion having a side chain as defined hereinbelow, use of the same particularly as polymerization initiators in the production of macromolecular polyoxymethylenes by polymerization of formaldehyde, and the polymerization process.

These compounds are novel and characterized, for example, by extremely high solubilities in hydrocarbons, small temperature dependence of the solubility, stability in solution for a long period of time, little coloration or discoloration for a long period of time, heat stability and little liability to coloration or discoloration by heat. They are useful in the industrial fields where these characteristics can be effectively utilized.

There are particularly provided in the present invention use of the compounds as initiators for polymerization of formaldehyde and the polymerization process.

2. Description of the Prior Art

A variety of substances have been proposed as the polymerization initiator for the production of straight chain macromolecular polyformaldehyde by polymerizing substantially anhydrous formaldehyde in an inert solvent. However, all of them are not necessarily effective in practical use and selection of the catalyst is critical in respects such as desired degree of polymerization and molecular weight distribution in the resulting polymer and acceleration of coloration of pyrogenolysis of the polymer by the catalyst residue, if retained in the polymer.

The ammonium salts described in U.S. Pat. No. 2,994,687, French Pat. No. 1,156,879, West German Pat. No. 1,230,219 and British Pat. No. 793,673 may be useful initiators, though being more or less defective.

SUMMARY OF THE INVENTION

In the course of investigations on the effects of various compounds as the initiators for polymerization of formaldehyde we have found that certain compounds have capacities very favorable in practical use and the present invention is based upon the finding.

BRIEF DESCRIPTION OF THE DRAWING

The annexed drawing shows infrared spectrum of dimethyldistearylammonium dodecenylsuccinate prepared by the procedures in Example 5 described hereinafter.

DESCRIPTION OF THE INVENTION

This invention involves a process for producing macromolecular polyformaldehyde which comprises polymerizing substantially anhydrous formaldehyde in an inert medium at a temperature from $-20°C$ to $100°C$ in the presence of an ammonium salt represented by the general formula

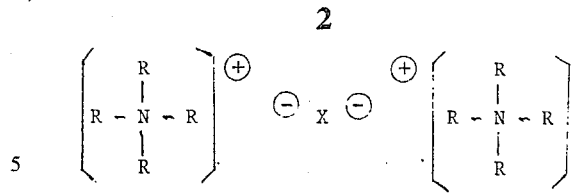

wherein R is alkyl, aralkyl, alkoxy or alkylaryl containing 2 or more carbon atoms and may be the same or different or two R's may form a ring each other and X is an aliphatic dicarboxylate radical with a side chain containing 6 or more carbon atoms and being alkyl, alkoxy, polyalkylene, alkenyl or polyalkenyl.

Unlike known onium di-cations such as, for example, bis(tribuylammonium iodide)propane, these ammonium compounds comprise mono-cations as the onium and a salt thereof with a di-anion and so they are different in exhibition of the effect.

As stated above, use of onium salts in the polymerization of formaldehyde has heretofore been known, but all of the salts are salts with a monocarboxylic acid or with an inorganic strong acid, particularly with a hydrogen halide. They are quarternary ammonium salts wherein at least two long-chain hydrocarbon groups respectively containing at least 12 carbon atoms are connected with the central nitrogen atom.

On the other hand, the ammonium salt of the present invention is distinguished by the central nitrogen atom to which are connected alkyl, aralkyl, alkoxyalkyl or polyoxyalkylene groups respectively containing 1 or more carbon atoms, and a dicarboxylate having a long side chain. Most of these salts are new. Use of such salts for the polymerization of formaldehyde is new.

Selection of the acid radical is especially critical. In the polymerization to macromolecular polyformaldehyde the solvent is preferably aliphatic or alicyclic hydrocarbons in view of easiness in dehydration, purification and recovery, as well as in handling, toxicity and solubilities of the monomer and polymer, although any solvent inert to formaldehyde may be used. These nonpolar solvents, however, are restricted in use for the polymerization of formaldehyde by solubility, because, in general, polar substances such as onium compounds are hardly soluble therein. For example, certain ammonium chlorides are almost insoluble in these solvents and so the polymerization cannot be homogeneously effected therewith. Even with a fatty acid salt, there remain difficulties in most cases. Improvements by the use of a long-chain group attached to the nitrogen atom are still limited for overcoming the difficulties. Replacement of the acid residue with a dicarboxylate somewhat improves the solubility, but is still unsatisfactory. This is especially disadvantageous in that the solubility is greatly dependent upon temperature and the solution is not sufficiently stable to be kept for a long period of time with a result of precipitation to clogged pipe, valve and meter.

We have now discovered that selection of a dicarboxylic acid with an organic side-chain group containing 6 or more carbon atoms produces satisfactory results from various industrial points of view such as solubility, stability in solution, polymerization activity, influence of the residue on the polymer, handling and recovery.

Examples of the dicarboxylic acid to be used according to the invention are laurylsuccinic acid, stearylsuccinic acid, isostearylsuccinic acid, hexenylsuccinic acid, diisobutenylsuccinic acid, dodecenylsuccinic acid, polyisobutenylsuccinic acid, pentadecenylsuccinic acid, dimer acid or trimer acid produced by polymerization of an unsaturated monocarboxylic acid, cyclohexylsuccinic acid, hexyl ether of oxymalonic acid, alkylene gylcol ether of malic acid, stearylmalonic acid and hexylmalonic acid.

Illustrative of the organic radicals directly attached to the central nitrogen atom are ethyl, propyl, isopropyl, butyl, isobutyl, pentyl, hexyl, isohexyl, octyl, isooctyl, lauryl, stearyl, palmityl, benzyl, cyclohexyl, cyclopentamethylene, cyclooxapentane (morpholino), methoxyethyl, methoxybutyl and methoxydiethylene.

The ammonium salts containing these dicarboxyplate as the acid group not only are readily soluble in aliphatic hydrocarbons but also are stable per se as well as in soluble state.

Production of these dicarboxylate-containing ammonium salts can be made by the exchange reaction with a corresponding ammonium halide, or the reaction between a corresponding ammonium hydroxide and dicarboxylic acid. The processes for the production as well as the products may be regarded as novel.

These ammonium compounds are obtained as a solid, wax or paste and can be determined to be an onium salt by means of elementary analysis and other chemical analyses, although some have no definite melting point. Production of these onium salts will be described in more detail hereinbelow by examples.

These onium salts, which are much more soluble in aliphatic hydrocarbons than the known ones, are also effective and useful as anticorrosion agents, additives for gasolines and other fuels, activators, additives for plastics and rubbers, additives for paints and adhesives. In the present invention, use thereof as polymerization catalysts for formaldehyde is an important object.

Production of polyoxymethylene by polymerization of formaldehyde is well known and is made from substantially anhydrous formaldehyde in the presence of a polymerization initiator (catalyst) by introducing the gaseous formaldehyde into a purified inert medium, by supplying the formaldehyde absorbed in the medium or by adding the catalyst to the formaldehyde absorbed in the medium.

There is no limitation to the polymerization procedures in the present invention and any known methods or their modifications may be employed.

On the other hand, the methods that are not feasible with prior catalysts due to their low solubilities and stabilities can also be applied. For example, storage, transportation, preparation and polymerization using an aliphatic hydrocarbon such as pentane, hexane, heptane or cyclohexane as the medium have become feasible. It is also possible to escape from disadvantages accompanied by prior higher aliphatic ammonium salts using, for example, beef tallow such as contamination with impurities, need of purification and coloration to improve the quality of polyoxymethylene composition by using a product of higher purity.

The ammonium salts of the present invention are used in an amount of from $10^{-4}$ to $5 \times 10^{-2}$ mole percent based on formaldehyde monomer.

Furthermore, the use of an ammonium salt according to the invention is distinguished from that of prior monoanionic ammonium compounds in that polyoxymethylene with narrower distribution of molecular weights is obtained. As a matter of fact, molecular weight distribution, that is, $\overline{Mw}/\overline{Mn}$ wherein $\overline{Mw}$ is weight average molecular weight and $\overline{Mn}$ is number average molecular weight, is 2.0 or more in case where a prior ammonium salt is used, whereas it is 2.0 or less, usually from 1.9 to 1.6 in the polymerization with a catalyst according to the invention under the same conditions. This is one of the characteristic features of the invention in consideration of the production of compositions with superior physical properties, especially toughness.

The polymer produced according to the invention is stabilized by known end capping and is then processed to resin composition with incorporation of heat stabilizer, antioxidant, filler or the like.

DESCRIPTION OF PREFERRED EMBODIMENTS

The following examples will illustrate the invention in greater detail, and it is to be understood that the invention is not to be limited thereto.

Physical properties of the polymers given in the examples were measured by the procedures set forth below. Reduced viscosity ($\eta$ sp/c) : Measurement is made under the conditions : In 50:50 by weight mixture of p-chlorophenol and tetrachloroethane; at a polymer concentration of 0.5 g. per 100-ml. solvent; 60°C. $K_{222}$(percent/min.) : The polymer of which end groups are acetylated is maintained at 222°C. under nitrogen to determine the costant of pyrolytic rate. Number average molecular weight ($\overline{Mn}$) : $\overline{Mn}$ of the end acetylated polymer is determined by the osmotic pressure method described in J. Appl. Polymer Sci., I, 164 (1959). Weight average molecular weight/Number average molecular weight ($\overline{Mw}/\overline{Mn}$) : Weight average molecular weight ($\overline{Mw}$) is determined according to the light scattering method described in J. Polymer Sci., A-2, 4, 437 (1966). The ratio of $\overline{Mw}$ to $\overline{Mn}$ constitutes a measure of molecular weight distribution. Color of formed plate : It is measured by color-and-color-Difference-Meter manufactured by Nippon Denshoku Kogyo K. K. and expressed in terms of L and bL. The higher the value of L, brightness is higher and the lower the value of bL, coloration (yellowness) is less.

EXAMPLE 1

Paraformaldehyde thoroughly dehydrated and dried was pyrolyzed at 130° – 140°C. and then passed through cooling traps to obtain formaldehyde gas of a purity of 99.9 percent or higher. The formaldehyde gas was passed at a rate of 100 g. per hour through a 2-liter separable flask equipped with a stirrer and contained therein a medium described hereinafter.

Separately, an onium compound containing two carboxy anions was prepared from dimethyldistearylammonium hydroxide and dodecenylsuccincic acid at a molar ratio of 2:1.

A hexane solution containing the initiator at 200 p.p.m. was continuously supplied to the flask at a rate of 600 ml. per hour while continuously withdrawing the reaction slurry to maintain average volume of the slurry remaining in the reaction vessel at a level of 600 ml. Polymerization was continued for 10 hours while maintaining the reaction temperature at 50°C. with stirring. The reaction mixture was then filtered to separate white powders. The separated polymer was stabilized by subjecting it to end groups acetylation treatment.

Physical properties of the resulting polymer are as follows: $K_{222}$(percent/min.), 0.02; $\overline{Mn}$, 49,000; $\overline{Mw}/\overline{Mn}$, 1.7; color of the formed plate, L 83.5, bL 2.6.

For comparison's sake, the same procedures were repeated except using a hexane solution containing as the initiator dimethyldistearylammonium acetate at 200 p.p.m. Physical properties of the resulting polymer are as follows: $K_{222}$(percent/min.), 0.06; $\overline{Mn}$, 42,000; $\overline{Mw}/\overline{Mn}$, 2.4; color of the formed plate, L 81.3, bL 4.2.

These data indicate that use of a catalyst according to the invention results in the polymer higher in $\overline{Mn}$, lower in $\overline{Mw}/\overline{Mn}$ and better in heat stability and whiteness than that of a prior onium salt.

EXAMPLE 2

As the polymerization catalyst was prepared an onium salt containing two carboxy anions from tetrabutylammonium hydroxide and stearylmalonic acid at a molar ratio of 2:1. A hexane solution containing the catalyst at 200 p.p.m. was continuously supplied to a polymerization vessel for conducting the same procedures as in Example 1. Physical properties of the resulting polymer are as follows: $K_{222}$(percent/min.), 0.04; $\overline{Mn}$, 51,000; $\overline{Mw}/\overline{Mn}$, 1.7; color of the formed plate, L 82.3, bL 2.7.

For comparison's sake, the same procedures were repeated except using a hexane solution in which tetrabutylammonium laurate was dispersed* as the initiator. Physical properties of the resulting polymer are as follows: $K_{222}$(percent/min.), 0.10; $\overline{Mn}$, 41,000; $\overline{Mw}/\overline{Mn}$, 2.7; color of the formed plate, L 80.4, bL 4.9.

*Tetrabutylammonium laurate is almost insoluble in hexane at 50°C.

These data indicate that use of a catalyst according to the invention results in the polymer higher in $\overline{Mn}$, lower in $\overline{Mw}/\overline{Mn}$ and better in heat stability and whiteness than that of a known onium salt.

EXAMPLE 3

An onium compound containing two carboxy anions was prepared from dimethyldiheptadecylammonium hydroxide and dimer acid at a molar rate of 2:1. A hexane solution containing the catalyst at 100 p.p.m. was continuously supplied to the reaction vessel at a rate of 1000 ml. per hour while continuously withdrawing the reaction slurry to maintain the average volume of the slurry in the vessel at 1000 ml. Into the reaction vessel was introduced formaldehyde gas of a purity of 99.9 percent at a rate of 110 g. per hour. The reaction was continued for 8 hours while maintaining the reaction temperature at 55°C. The reaction mixture was treated in the same manner as in Example 1 to obtain a polymer having 1.9 of $\overline{Mw}/\overline{Mn}$.

EXAMPLE 4

In a beaker equipped with a stirrer and a pH electrode were placed 520 g. of 10 percent aqueous solution of commercially available tetrabutylammonium hydroxide and 400 ml. of ethanol. 20 percent ethanol solution of dodecenylsuccinic acid was added to the mixture while stirring until pH became 8.8. The solvent was then removed from the mixture in a rotary evaporator under a reduced pressure at 20 mm.Hg at a bath temperature of 80°C to give 75 g. of tetrabutylammonium dodecylsuccinate. Softening point: 50°C. Elementary analysis: C, 75.22 percent; H, 12.75 percent; N, 3.63 percent (calculated: C, 75.20 percent; H, 12.79 percent; N, 3.66 percent.

EXAMPLE 5

In a flask equipped with a thermometer, stirrer and nitrogen inlet were placed 800 ml. of ethanol and 59 g. of dimethyldistearylammonium chloride to give a solution. To the solution was added under nitrogen with stirring 100 ml. of 1 N KOH-ethanol and the resulting mixture was stirred at a temperature of 50°C. for additional 3 hours. After cooled to room temperature, precipitates of potassium chloride were separated by filtration. To the solution was then added 20 percent ethanol solution of dodecenylsuccinic acid in the same way as in Example 4 until pH became 8.7. The solvent was subsequently distilled off under reduced pressure. To the residue was added 300 ml. of n-hexane to extract n-hexane soluble fraction. The hexane was distilled off from the hexane extract to yield 64 g. of yellow waxy dimethyldistearylammonium dodecenylsuccinate. Softening point: ca. 45°C. Elementary analysis: C, 79.91 percent; H, 13.47 percent; N, 2.00 percent (calculated: C, 79.88 percent; H, 13.46 percent; N, 2.03 percent). Infrared spectrum of the product is shown in the annexed drawing.

EXAMPLE 6

Through a glass column filled with about 1 liter of strongly basic ion-exchange resin (Trade name Amberlite IRA-27) in advance converted with 1 N aqueous solution of NaOH to the OH form and throughly washed with water was passed a solution of 585 g. of dimethyldistearylammonium chloride dissolved in 2 liters of ethanol over a period of 2 hours. 5 liters of ethanol was passed therethrough to effuse the dimethyldistearyl ammonium hydroxide in the column. To the effluent collected was added 20 percent ethanol solution of dimer acid in the same way as in Example 4 until pH became 8.8. Then, the solvent was removed under reduced pressure to give 765 g. of the quaternary salt of dimer acid as pale yellow waxy residue. Softening point: ca. 30°C. Elementary analysis: C, 79.71 percent: H, 13.70 percent; N, 2.01 percent.

EXAMPLE 7

Dimethyldistearylammonium hydroxide and tetrabutylammonium hydroxide were prepared in the same way as in Example 6 respectively from dimethyldistearylammonium chloride and tetrabutylammonium chloride. The hydroxides were reacted with dodecenylsuccinic acid, polyisobutenylsuccinic acid, dimer acid, acetic acid (for reference), stearic acid (for reference) and adipic acid (for reference) respectively to prepare corresponding quaternary ammonium salts. Solubilities in n-hexane of these salts in terms of dissolved grams per 1000 ml. of n-hexane are shown in Table-1.

Table 1

Solubilities of quaternary ammonium salts

| Quaternary ammonium salt | Solubility in n-hexane (grams/1000 ml.) | | |
|---|---|---|---|
| | at 0°C. | at 25°C. | at 60°C. |
| Tetrabutylammonium chloride | ~ 0 | ~ 0 | ~ 0 |
| Tetrabutylammonium acetate | ~ 0 | ~ 0 | < 1 |
| Tetrabutylammonium stearate | < 1 | < 1 | 3 |
| Tetrabutylammonium adipate | ~ 0 | ~ 0 | < 1 |

Table 1 —Continued

Solubilities of quaternary ammonium salts
Solubility in n-hexane
(grams/1000 ml.)

| | | | |
|---|---|---|---|
| Tetrabutylammonium dodecenylsuccinate | ∞ | ∞ | ∞ |
| Tetrabutylammonium polyisobutenylsuccinate | ∞ | ∞ | ∞ |
| Dimethyldistearylammonium chloride | ~0 | <1 | 2 |
| Dimethyldistearylammonium acetate | 3 | 75 | 120 |
| Dimethyldistearylammonium stearate | 12 | 93 | 175 |
| Dimethyldistearylammonium adipate | ~0 | <1 | 3 |
| Dimethyldistearylammonium dodecenylsuccinate | ∞ | ∞ | ∞ |
| Dimethyldistearylammonium polyisobutenylsuccinate | ∞ | ∞ | ∞ |

We claim:

1. Process for producing macromolecular polyoxymethylene which comprises polymerizing substantially anhydrous formaldehyde in the presence of a diammonium salt consisting essentially of an ammonium cation having four organic groups attached to the nitrogen atom thereof selected from the group consisting of alkyl, aralkyl, alkoxyalkyl and alkylaryl each containing at least two carbon atoms, wherein said groups can be the same or different and two of the same can form a ring with each other, and an aliphatic dicarboxylate anion having a side chain containing at least six carbon atoms and selected from the group consisting of alkyl, alkoxy, polyalkylene, alkenyl and polyalkenyl chain.

2. The process of claim 1, wherein the amount of said diammonium salt employed is from about $10^{-4}$ to about $5 \times 10^{-2}$ mole percent based upon formaldehyde monomer.

3. The process of claim 1, wherein the molecular weight distribution of the macromolecular polyoxymethylene so produced is from 1.6 to 1.9.

4. Process according to claim 1 wherein the diammonium salt is di(dimethyldistearylammonium) dodecenylsuccinate.

5. Process according to claim 1 wherein the diammonium salt is di(tetrabutylammonium) stearylmalonate.

6. Process according to claim 1 wherein the diammonium salt is di(dimethyldilaurylammonium) dimer acid salt.

7. The process for producing macromolecular polyoxymethylene which comprises polymerizing substantially anhydrous formaldehyde in the presence of a diammonium salt of the formula

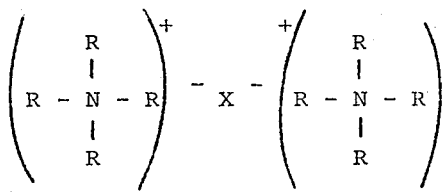

wherein R represents an organic group selected from the group consisting of alkyl, aralkyl, alkoxyalkyl and alkylaryl each containing at least two carbon atoms wherein said R groups can be the same or different and two of the same can form a ring with each other, and X represents an aliphatic dicarboxylate radical having a side chain containing at least six carbon atoms and selected from the group consisting of alkyl, alkoxy, polyalkylene, alkenyl and polyalkenyl chain.

* * * * *